US010233958B2

(12) United States Patent
Coffiney

(10) Patent No.: US 10,233,958 B2
(45) Date of Patent: Mar. 19, 2019

(54) BOLTED CONNECTION

(71) Applicant: AIRBUS SAFRAN LAUNCHERS SAS, Issy les Moulineaux (FR)

(72) Inventor: Sebastien Coffiney, Eysines (FR)

(73) Assignee: AIRBUS SAFRAN LAUNCHERS SAS, Issy les Moulineaux (FR)

( * ) Notice: Subject to any disclaimer, the term of this patent is extended or adjusted under 35 U.S.C. 154(b) by 110 days.

(21) Appl. No.: 15/125,844

(22) PCT Filed: Mar. 11, 2015

(86) PCT No.: PCT/EP2015/055093
§ 371 (c)(1),
(2) Date: Sep. 13, 2016

(87) PCT Pub. No.: WO2015/135998
PCT Pub. Date: Sep. 17, 2015

(65) Prior Publication Data
US 2017/0009795 A1    Jan. 12, 2017

(30) Foreign Application Priority Data

Mar. 13, 2014  (FR) .................................... 14 52084

(51) Int. Cl.
*F16B 31/04* (2006.01)
*B23P 19/06* (2006.01)
*B25B 29/02* (2006.01)

(52) U.S. Cl.
CPC .......... *F16B 31/043* (2013.01); *B23P 19/067* (2013.01); *B25B 29/02* (2013.01)

(58) Field of Classification Search
CPC ....... F16B 31/043; B23P 19/067; B25B 29/02
See application file for complete search history.

(56) References Cited

U.S. PATENT DOCUMENTS 3,841,193 A    10/1974  Ito
2007/0166121 A1  7/2007  Mynhier et al.

FOREIGN PATENT DOCUMENTS

FR    1402242     6/1965
WO    9533598    12/1995

OTHER PUBLICATIONS

International Search Report, International Application No. PCT/EP2015/055093, dated May 15, 2015.

*Primary Examiner* — John C Hong
(74) *Attorney, Agent, or Firm* — Perman & Green, LLP

(57) ABSTRACT

The subject of the invention is an assembly and clamping bolt to be employed under tension, having a shank and a head, wherein the head, situated at a first end of the shank, is provided with a clamping tensioning means with a hydraulic cylinder mounted permanently on the bolt, clamping taking place between a rear shoulder device and the hydraulic cylinder, the rear shoulder device being disposed at a second end of the shank.

18 Claims, 4 Drawing Sheets

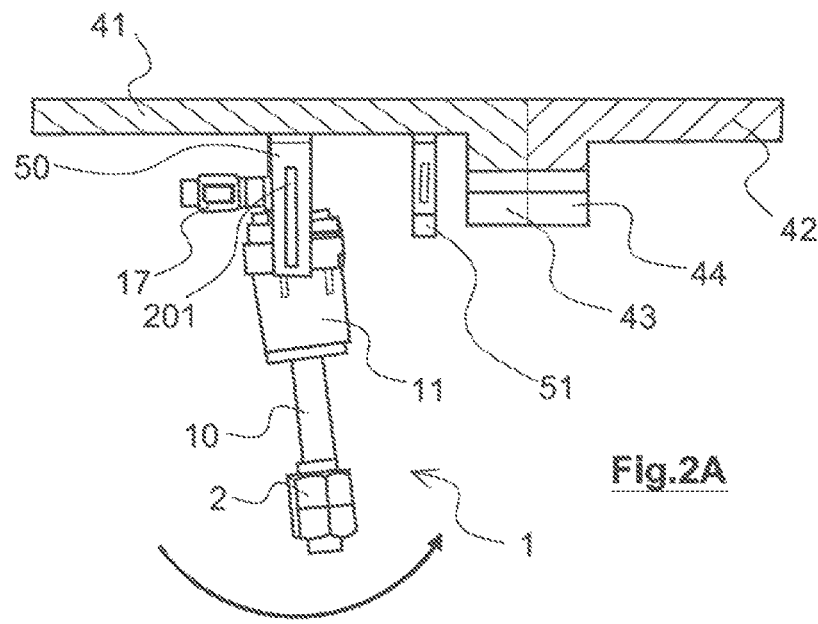
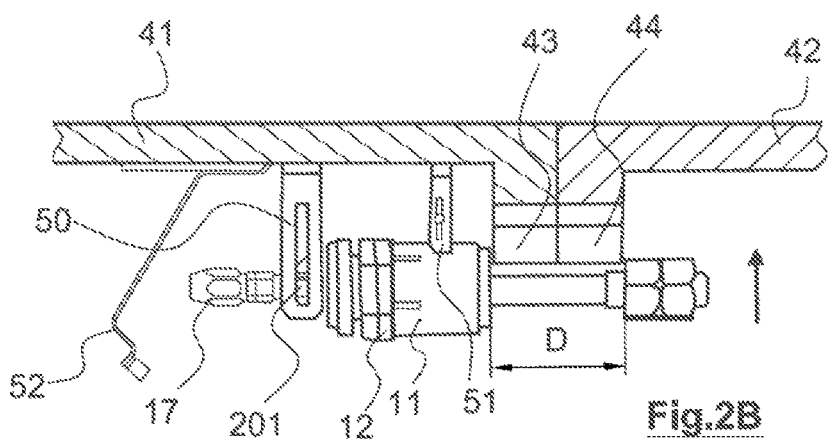
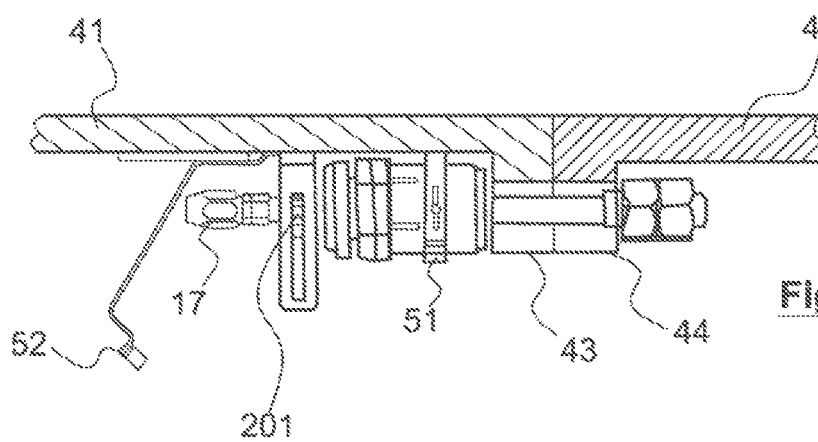

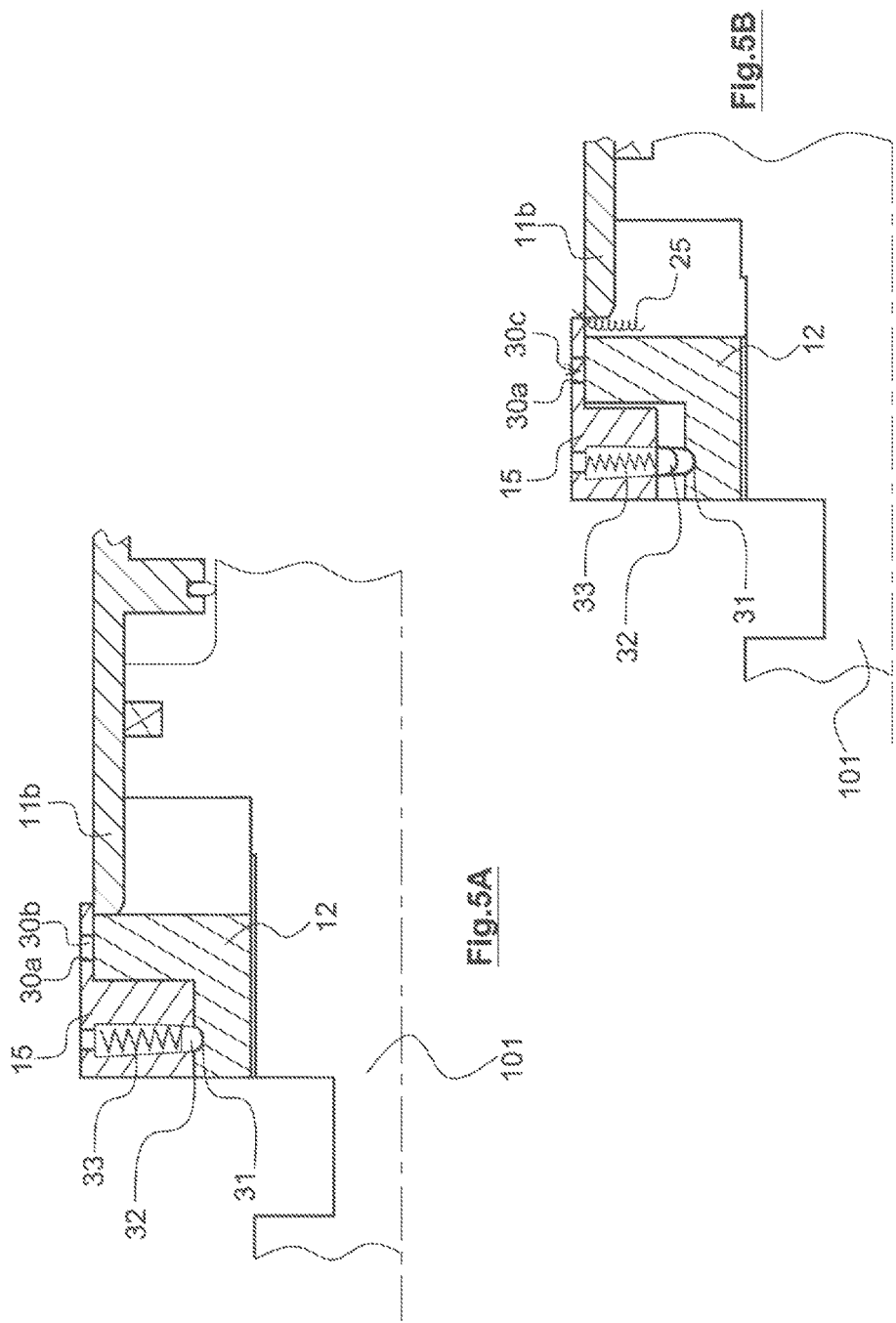

BOLTED CONNECTION

CROSS REFERENCE TO RELATED APPLICATIONS

This application is the National Stage of International Application No. PCT/EP2015/055093, having an International Filing Date of 11 Mar. 2015, which designates the United States of America, and which International Application was published under PCT Article 21(2) as WO Publication No. 2015/135998 A1, and which claims priority from and the benefit of French Application No. 1452084, filed 13 Mar. 2014, the disclosures of which are incorporated herein by reference in their entireties.

BACKGROUND

1. Field

The presently disclosed embodiment concerns the field of bolted connections and more particularly bolted connections of large diameter, notably greater than M24, and high tightening torque, such as those used in the automotive, railway, maritime and even undersea, offshore, nuclear, etc. industries.

2. Brief Description of Related Developments

In these applications, a high level of safety and of reliability of the connection is required, which means in particular good reproducibility and repeatability of the residual tension after tightening. Also a certain ease and rapidity of use, even and above all in difficult environmental surroundings and under difficult environmental conditions, whether this be for reasons of accessibility, corrosion or nuclear radiation.

Three techniques are known for tightening bolted connections: torque tightening, thermal tightening, mechanical traction tightening.

Overall, the correct strength of a bolted connection is linked directly to the value of the residual tension in the connection after tightening.

The best known tightening method, which consists in tightening the connection by applying a torque to it by screwing action via the screwthread, is associated with a very wide dispersion of this residual tension. It is accepted that this dispersion is +/−20% in the best case scenario—with good control of the tightening torque—but is more generally ±/−60%.

What is more, torque tightening induces unwanted effects in the bolts, for example torsion effects, which render the connection even more uncertain.

Also, torque tightening implies friction between screwthreads, which gradually degrades the surfaces in contact and limits the possibility of effecting a plurality of successive tightenings/loosenings.

Finally, torque tightening generally does not make possible the simultaneous tightening of a plurality of connections, which further limits the fastening efficacy that it might be hoped to achieve.

Because of this, an alternative to torque tightening was invented a long time ago: tension tightening, with a first variant consisting in thermal tightening that employs thermal and/or differential expansion. However, given all the constraints associated with the use of heating to a high temperature, its use is limited.

Tension tightening is more simply effected by applying mechanical tension to the bolt.

Of these tensioning methods, of concern here is tensioning by hydraulic traction that makes it possible to control the residual tension in the shank by application of a pure traction force and makes a small dispersion possible.

In the field of hydraulic tensioning of threaded rods by pure traction, a plurality of methods exist.

There exists firstly a tightening method using a hydraulic tensioner. The tensioner is fitted to a standard bolt already mounted and pre-tightened or to a nut already in contact. The actuator stretches the bolt by hydraulic pressure and the nut is returned to contact with the parts to be clamped, which maintains the stretching of the bolt and produces the residual tension therein after relaxation.

The actuator is then removed, only the standard bolt remaining in place. The use of this type of technology also offers the possibility of tightening multiple connections simultaneously and therefore of obtaining a better distribution of the tensions in flanged connections.

There also exists a tightening method using a hydraulic nut. The hydraulic nut functions in accordance with the same principle as the hydraulic tensioner, the difference being that it replaces the standard nut on the bolt and therefore remains in place after tightening. Research has also been conducted into integrating a hydraulic piston into a bolt in order to stretch it. Placing the nut on the stretched bolt and releasing the pressure then produces the residual tension in the bolt.

In fact numerous devices, in particular hydraulic devices, are commercially available enabling tension tightening to be used, but it is clear that they may be complicated to use.

In fact this necessitates:
placing the bolt and the nut on the parts to be assembled;
placing the hydraulic tensioner and its hydraulic feed;
tensioning the bolt; locking the bolt;
verifying the tightening;
demounting the tensioner.

In an aggressive environment, for example a radioactive or deep water environment, or merely for economic reasons, it would be desirable to reduce these operating times, even to automate tightening and loosening when there is a requirement to assemble and to disassemble several times.

SUMMARY

The presently disclosed embodiment therefore relates to an integrated assembly device of the type employing a bolt under tension that makes possible simplification of the operations that must be carried out by the operators at the same time as ensuring control of the assembly and the quality thereof.

The principle of the disclosed embodiment consists in integrating a hydraulic actuator permanently into the bolt to be tightened.

A shoulder device, for example a nut, is fixed to the end of the bolt opposite that carrying the hydraulic actuator.

To be more precise the presently disclosed embodiment proposes an assembly and clamping bolt to be used under tension including a shank and a head the head of which, situated at a first end of the shank, includes hydraulic actuator tightening tensioning means permanently mounted on the bolt, tightening being effected between a rear shoulder device and the hydraulic actuator, the rear shoulder device being disposed at a second end of the shank.

The actuator preferably includes a cylinder facing the rear shoulder device, parts being clamped between an annular rear face of the cylinder and the rear shoulder device.

The bolt advantageously includes a device for locking the tightening tension once the actuator of the tensioning means has been actuated.

The shoulder device preferably includes at least one stop nut, the shank including a thread receiving said stop nut over at least a part of said second end.

The head advantageously includes a bearing surface for means for loosening the bolt.

The actuator may notably include a piston formed by a flange on the shank.

The actuator may include a hydraulic feed discharging into a face of the piston facing an internal face of the cylinder surrounded by a first skirt itself surrounding the piston in a sealed manner.

The cylinder advantageously includes an annular cylinder body mounted to slide on the shank and including sealing means between the shank and the cylinder.

Return springs of the cylinder are preferably disposed between a flange screwed to the shank and a rear face of the cylinder body.

The rear face of the cylinder may be annular and consist of the free end of a second skirt extending from the cylinder body and surrounding the springs.

The hydraulic actuator tightening tensioning means are advantageously connected to a pipe from a hydraulic source by means of connectors mounted on rotary turrets which make it possible to move the bolt in rotation while the pipe remains in the same orientation.

The turrets are advantageously disposed along a longitudinal axis perpendicular to the body of the bolt and free to rotate about their longitudinal axis whereas the connectors themselves are oriented at 90° to the axis of the turrets, which makes it possible to orient the connectors angularly relative to the axis of the bolt.

The head advantageously includes an angular engagement area that makes manual loosening of the bolt possible with nuts at the level of the rear shoulder.

The bolt advantageously includes releasable coupling means between the device for locking the tension and a ring driving that device, said means being designed to allow the ring to drive the device in the absence of resisting force.

The disclosed embodiment further concerns an assembly device wherein the bolt is advantageously received in a grooved first support allowing rotation of the bolt and movement in translation of the bolt parallel to itself.

The assembly device may include a second support for temporary retention of the bolt in a waiting position.

It may include a spring clamp type third support for retaining the bolt in an operating position.

The disclosed embodiment further provides an assembly system including is plurality of assembly devices in accordance with the disclosed embodiment and wherein the bolts of the assembly devices are connected in alternating groups to separate pressure sources.

The disclosed embodiment finally provides a method of assembling parts by means of at least one bolt of the invention and wherein
- a distance D between the bolt head and the rear shoulder device is adjusted,
- the bolt is put in place,
- the bolt is put under hydraulic pressure so as to clamp the parts to be fixed between the head and the rear shoulder device,
- the bolt is mechanically locked by tightening a tightening tension locking device.

The device including a correct tightening marker, a ring of the tightening tension locking device is turned until said marker appears.

BRIEF DESCRIPTION OF THE DRAWINGS

Other features and advantages of the disclosed embodiment will be apparent on reading the following description of one nonlimiting aspect of the disclosed embodiment with reference to the drawings which show:

FIGS. 2A, 2B, 2C are side views of an assembly device in accordance with the disclosed embodiment in three positions;

FIGS. 5A and 5B are two views in section of a detail of a device for verifying and showing the correct position of the bolt of the disclosed embodiment.

DETAILED DESCRIPTION

Figure 1:
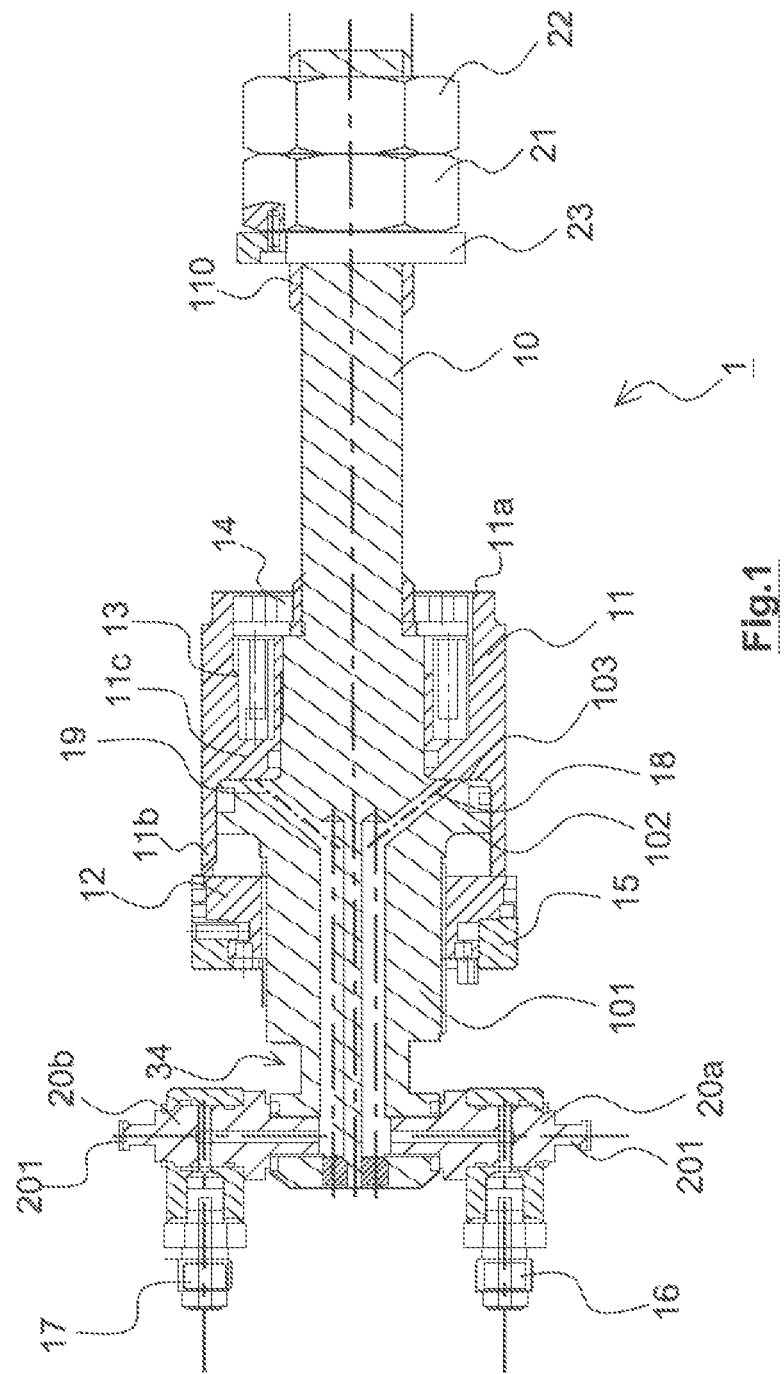
FIG. 1 is a side view of a longitudinal section of a bolt in accordance with the disclosed embodiment.

FIG. 1 represents an integrated assembly device in accordance with the disclosed embodiment of the type employing a bolt under tension that makes it possible to simplify the operations that must be carried out by the operators to clamp parts with the bolt at the same time as ensuring control of assembly and the quality thereof.

The device constitutes a hydraulic bolt 1 that includes a shank 10 including a first end on which is disposed an actuator cylinder 11 retained by a flange 14 screwed onto a thread at said first end of the shank 10 and return springs 13.

The shank 10 in this example includes at a second end a screwthread onto which there is screwed a device with a nut 21 and locknut 22, the nut 21 further carrying a washer 23 integral with it.

The parts to be clamped are positioned between a face 11a of the cylinder 11 of the actuator and the washer 23.

A nut for maintaining the tension 12 with a verification device including a ring 15 is screwed onto a rear body 101 forming the head of the bolt behind a skirt 11b of the cylinder 11. A hydraulic liquid inlet connector 16 communicates with feed pipes 18 feeding hydraulic fluid into the body 101 of the bolt and discharging into a face 103 of a flange 102 facing the rear of the cylinder 11 of the actuator.

The flange 102 therefore constitutes a piston of the actuator, to which the shank 10 is rigidly connected. Injecting hydraulic fluid into the feed pipes drives movement of the cylinder 11, the fluid filling the space delimited by the face 103 and the cylinder 11 inside the skirt 11b surrounding the flange/piston 102.

In this configuration the actuator is special in that the hydraulic fluid feed is effected through the piston and in that both the cylinder 11 and the flange/piston 102 are able to move, the cylinder moving provided that its face 11a and the nut 23 are not in contact with the parts to be clamped and the piston moving to stretch the shank 10 from the moment at which clamping of the parts between the cylinder 11 and the nut 23 begins.

To make tightening a plurality of bolts equipped with the device possible, an outlet connector 17 receives a hydraulic fluid return from the interface between the body of the bolt and the actuator via a pipe 19.

In this example the inlet connector 16 and the outlet connector 17 are mounted on rotary turrets 20a, 20b.

In this example the turrets are disposed along a longitudinal axis perpendicular to the body of the bolt and free to rotate about their longitudinal axis, whereas the connectors themselves are oriented at 90° to the axis of the turrets, which makes it possible to orient the connectors angularly relative to the axis of the bolt.

The hydraulic bolt is based on the operation of a standard actuator, the cylinder 11 of the actuator embodying the function of the screwthread of a bolt.

Here the fixing is effected between the cylinder of the actuator and the nut 21.

The distance D between the bolt head and the nut identified in FIG. 2b is adjusted before installing the bolt. The distance D is defined to be compatible with the stroke of the actuator, for example 5 mm, and once adjusted this distance makes tightening possible without manual intervention up to the stage of placing the nut 12 for maintaining the tension. When the actuator is pressurized, the cylinder 11 is moved into contact with the parts to be clamped between the cylinder and the nut, after which a pressure force is generated that by reaction triggers the stretching of the shank 10 because of the thrust on the rear body 101.

These movements generate a clearance between the skirt 11b of the cylinder and the nut 12 for maintaining the tension corresponding to the stroke that moves the cylinder into contact with the parts to be clamped and to the stretching of the shank. This nut 12 is then brought into contact with the skirt 11b of the cylinder 11, which locks the bolt and maintains the stretching of the shank 10. The bolt is therefore mechanically locked by the contact of the nut for maintaining the tension with the cylinder of the actuator.

Placing the nut for maintaining the tension is a delicate operation. At a pressure of 700 bar the stretching of the shank 10 is of the order of 0.2 mm for a shank of 30 mm diameter, which implies the necessity of placing the nut 12 for maintaining the tension in perfect contact.

The hydraulic bolt integrates a device for verifying and showing correct positioning of the bolt.

Figures 4A, 4B:
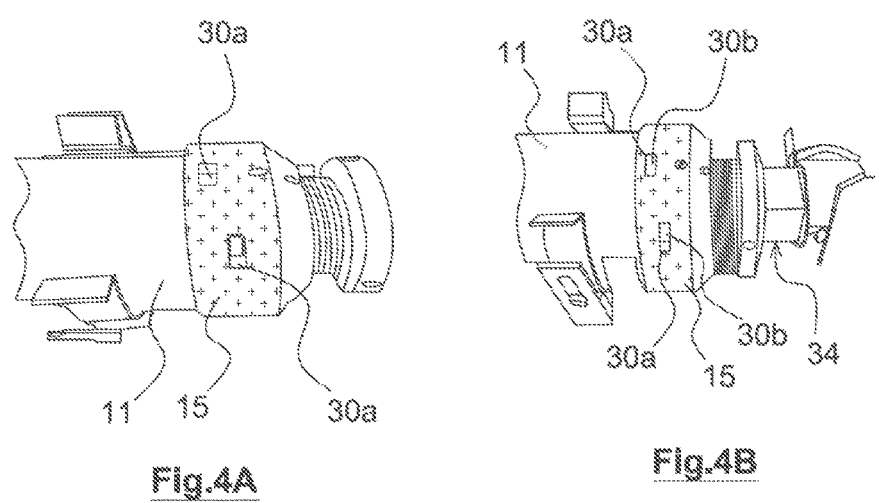
FIGS. 4A and 4B are two side views of a constructional detail of a bolt in accordance with one particular aspect of the disclosed embodiment.

The display device includes openings 30a represented in FIGS. 4A and 4B enabling correct placement of the nut for maintaining the tension in that a colored marker 30b appears in the openings 30a only when the movement of the nut 12 is sufficient.

This verification device is designed to make it possible to lock the nut for maintaining the tension, to show locking thereof, and to show a locking defect if the locking surface of the nut 12 on the skirt 11b is polluted by a foreign body 25 of shaving type as represented in FIG. 5B.

Operation is based on the use of releasable coupling means between the nut 12 for maintaining the tension and the ring 15. These means are designed to allow the ring to drive the nut in the absence of resisting force and in particular until the skirt 11b comes into contact with the front face of the nut 12.

Once the nut 12 is in contact with the skirt 11b, the coupling means, here in this nonlimiting example a system with balls 32 pushed forward by springs 33 and received in housings 31, are released. In the example shown, the balls push back the springs and leave the housings, which allows the ring to turn on the nut to place a marker 30b indicative of correct positioning in front of a window 30a, as represented in FIG. 5A.

If debris such as a shaving is wedged between the ring 15 and the skirt 11b as represented in FIG. 5B, the ring is immobilized and the nut 12 does not come into contact with the skirt 11b. In this case, the coupling means cannot be released and the correct position marker does not appear in the window 30a.

Once the nut for maintaining the tension is brought into contact with the skirt 11b of the cylinder 11 of the actuator it is then possible to release the pressure in the hydraulic circuit whilst maintaining the stretching of the shank.

In accordance with the example represented in FIGS. 2A to 2C, using the device entails pivoting the bolts 1. In accordance with this example, the parts 41, 42 to be clamped include cut-outs 43, 44 formed by a cylindrical cut-out of the bore type extended on one side to form a slot with a rounded bottom making it possible to move the bolt into position laterally with the locknut 21 already mounted in position.

In FIG. 2A, the bolt 1 is positioned in a first support 50 including an oblong opening receiving the shafts 201 at the end of the turrets 20a, 20b carrying the inlet/outlet connectors 16, 17.

In FIG. 2B, the bolt has been rotated to assume a position parallel to the slots 43, 44 of the parts 41, 42 to be clamped. The nut 21, locknut 22 and washer 23 on the bolt are positioned beforehand with a distance D between the face 11a of the cylinder and the washer 23 of the nut 21. The distance D takes account of the clearances necessary for triggering the device and makes it possible to eliminate any manipulation at the level of the nut/locknut.

In FIG. 2C, the bolt is in position and clipped into a spring collar 51 to make it possible to clamp the parts.

Figure 3:
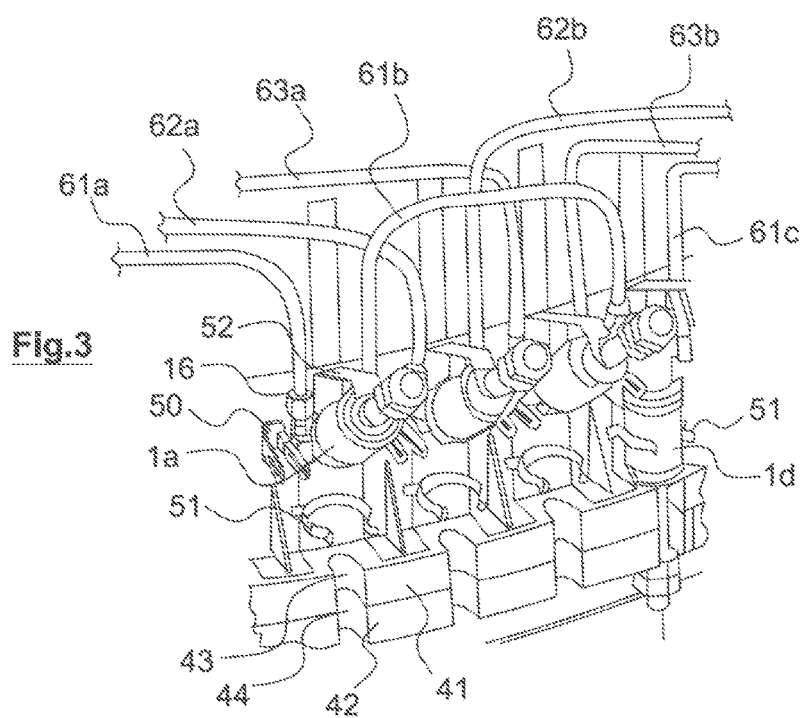
FIG. 3 is a partial view of an assembly system of the disclosed embodiment and parts assembled by means of such a system.

FIG. 3 represents parts 41, 42 with a plurality of slots 43, 44 for fastening them.

In the inclined waiting position, the bolt 1a is retained at the level of its shank 10 by a clamp 52.

This FIGURE makes it possible to see the bolts connected to hydraulic pressure circuits with the general references 61, 62, 63 with suffixes a, b, c. In this example three independent circuits each connect a plurality of bolts by their branches 61a, 61b, 61c, 62a, 62b, 63a, 63b, . . . which makes it possible to alternate the pressure circuits and to balance the pressures in the bolts fed by the same circuit and to alleviate a defective pressure circuit.

By design, a tightening device of this kind is reversible since it suffices to depressurize the bolt, unscrew the retaining nut 12 and then release the pressure to demount the bolt.

According to FIG. 3, the bolt is received in its spring collar 51 in the tightening position while the other bolts that can be seen are in the waiting position temporarily retained in second supports 52.

The device of the disclosed embodiment makes possible tightening without the presence of an operator and/or improved ergonomics because of the reduction of the necessary operator forces and assembly without tools. It makes possible good control of the accuracy and repeatability of the residual tension. It further makes possible a lengthening of the service life of the assembly devices, thanks to tightening under tension, verifying the residual tension; secure tightening, enabling reversion to a stable state (opening of the connection) from any degraded state (jamming, deterioration, fire, . . . ); to prevent manipulation errors and to optimize the operating times.

The concept of operation by pivoting makes it possible to optimize operating times and the times of exposure to aggressive environments, the manipulation of the hydraulic pump effecting the tensioning is effected remotely.

This optimization is achieved by the fact that tightening necessitates no intervention at the level of the nut of the bolt and that the operation proceeds without necessitating additional tools such as wrenches.

By adding a system for driving the pivoting and the positioning of the bolts and a system for driving the position of the nut 12 for maintaining the tension, tightening can be carried out without the presence of an operator.

The ergonomics and the use of this type of equipment are improved in the sense that the operators do not require to use any equipment.

Moreover, the pivoting support for the bolt is designed to absorb the loads when it is manipulated.

The solution makes it possible to eliminate entirely torque tightening and the high levels of uncertainty linked to friction. The residual tension obtained in the shank is generated entirely by pure traction and the tension is therefore controlled, accurate and repeatable.

The use of high-torque bolted connections generates risks of deterioration of the thread and therefore of jamming.

The hydraulic bolt entirely eliminates these risks linked essentially to the torque tightening method.

The hydraulic bolt integrates a device for showing correct placing of the nut for maintaining the residual tension.

In conjunction with input and output pressure monitoring, this device makes it possible to verify that the residual tension in the shank is correct.

The hydraulic bolt of the disclosed embodiment is designed to integrate safety devices making it possible to revert to a stable state (opening of the connection) from a degraded state (jamming, damage by fire, . . . ).

It is in particular possible to loosen the bolt because the head includes an angular engagement area or surface 34 represented in FIG. 1 and in FIG. 4B, this area being provided by a square rod in FIG. 4B. It is therefore possible by retaining the bolt by means of the square rod 34 to loosen it by turning the locknut 22 and then the nut 21 in an unscrewing direction.

Manipulation errors and numerous risks are also addressed by the safety devices (monitoring of incorrect placement of the nut for maintaining the residual tension, impossibility of placing the maintaining nut in the presence of pollution).

In some sensitive environments (fire risk) it is possible to drive the pivoting bolt not by means of oil but by means of water containing glycol.

The device of the disclosed embodiment may be adapted to any industry and to all fields requiring high-tension or high-torque tightening: automotive, railway, maritime, . . . , it is particularly suitable for use on flanged connections.

Its ability to function in aggressive environments including undersea environments and its safety level and its ergonomics and in particular its short manipulation time, low operator exposure, makes it particularly suitable for hazardous environments that are difficult to access such as for example in the nuclear, chemical, gas, petroleum, wind turbine, undersea pipe fields.

What is claimed is:

1. An assembly and clamping bolt for clamping under tension including a shank and a head wherein the head, situated at a first end of the shank, includes hydraulic actuator tightening tensioning means permanently mounted on the bolt, tightening being effected between a rear shoulder device and the hydraulic actuator, the rear shoulder device being disposed at a second end of the shank, the actuator including a cylinder facing the rear shoulder device, parts being clamped between an annular rear face of the cylinder and the rear shoulder device, and wherein the bolt includes a device for locking the tightening tension once the actuator of the tensioning means has been actuated, wherein said assembly and clamping bolt comprises releasable coupling means between the device for locking the tension and a driver ring for driving that device, said releasable coupling means being configured so that the driver ring drives the device in a direction tightening the device and locking the tightening tension in the absence of resisting force.

2. The assembly bolt as claimed in claim 1, wherein the shoulder device includes at least one stop nut, the shank including a thread receiving said stop nut over at least a part of said second end.

3. The assembly bolt as claimed in claim 1, wherein the head includes an angular engagement area forming a bearing surface for means for loosening the bolt.

4. The assembly bolt as claimed in claim 1, wherein the actuator includes a piston formed by a flange on the shank.

5. The assembly bolt as claimed in claim 1, wherein the actuator includes a hydraulic feed discharging into a face of the piston facing an internal face of the cylinder surrounded by a first skirt itself surrounding the piston in sealed manner.

6. The assembly bolt as claimed in claim 1, wherein the cylinder includes an annular cylinder body mounted to slide on the shank and including sealing means between the shank and the cylinder.

7. The assembly bolt as claimed in claim 6, wherein return springs of the cylinder are disposed between a flange screwed to the shank and a rear face of the cylinder body.

8. The assembly bolt as claimed in claim 7, wherein said rear face of the cylinder is annular and consists of a free end of a second skirt extending from the cylinder body and surrounding the springs.

9. The assembly bolt as claimed in claim 1, wherein the hydraulic actuator tightening tensioning means are connected to a pipe from a hydraulic source by means of connectors mounted on rotary turrets.

10. The assembly bolt as claimed in claim 9, wherein the turrets are disposed along a longitudinal axis perpendicular to the body of the bolt and free to rotate about their longitudinal axis whereas the connectors are themselves oriented at 90° to the longitudinal axis of the turrets which makes it possible to orient the connectors angularly relative to the axis of the bolt.

11. The assembly bolt as claimed in claim 1, wherein said assembly bolt integrates a device for verifying and showing correct positioning of the bolt.

12. The assembly bolt as claimed in claim 11, including a display device comprising at least one opening on the driver ring and a colored marker on the nut, the opening and the marker being positioned so that the latter appears in the opening only for a sufficient movement of the nut.

13. An assembly device including at least one bolt as claimed in claim 1, wherein the bolt is received in a grooved first support allowing rotation of the bolt and movement in translation of the bolt parallel to itself.

14. The assembly device as claimed in claim 13, including a second support for temporary retention of the bolt in a waiting position.

15. The assembly device as claimed in claim 13, including a third support of type spring clamp for retaining the bolt in an operating position.

16. An assembly system including a plurality of assembly devices as claimed in claim 13, wherein the bolts of the assembly devices are connected in alternating groups to separate pressure sources.

17. A method of assembling parts by means of at least one bolt as claimed in claim 1, wherein
 a distance D between the bolt head and the rear shoulder device is adjusted,
 the bolt is put in place,
 the bolt is put under hydraulic pressure so as to clamp the parts to be fixed between the head and the rear shoulder device, the bolt is mechanically locked by tightening a tightening tension locking device.

18. The method as claimed in claim 17, wherein the device including a correct tightening marker, a driver ring of the tightening tension locking device is turned until said marker appears.

\* \* \* \* \*